(12) United States Patent
Maruyama et al.

(10) Patent No.: US 7,016,156 B2
(45) Date of Patent: *Mar. 21, 2006

(54) DISK DRIVE HAVING MAGNETIC HEAD CONDUCTION PATHS WITH ARRANGEMENTS TO CONTROL IMPEDANCE

(75) Inventors: Yohji Maruyama, Iruma (JP); Hiroshi Ikekame, Tokyo (JP); Hisashi Takano, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/961,035

(22) Filed: Oct. 12, 2004

(65) Prior Publication Data

US 2005/0063097 A1  Mar. 24, 2005

Related U.S. Application Data (63) Continuation of application No. 10/624,939, filed on Jul. 22, 2003, which is a continuation of application No. 10/318,114, filed on Dec. 13, 2002, now Pat. No. 6,661,613, which is a continuation of application No. 10/126,576, filed on Apr. 22, 2002, now Pat. No. 6,529,348, which is a continuation of application No. 09/523,383, filed on Mar. 10, 2000, now Pat. No. 6,404,594.

(30) Foreign Application Priority Data

Mar. 12, 1999 (JP) .................................. 11-066016

(51) Int. Cl.
G11B 5/55 (2006.01)
(52) U.S. Cl. .................................. 360/245.8; 360/246
(58) Field of Classification Search ...... 360/245.8–246
See application file for complete search history.

(56) References Cited

U.S. PATENT DOCUMENTS

| | | | |
|---|---|---|---|
| 5,608,591 A | 3/1997 | Klaassen |
| 5,717,547 A | 2/1998 | Young |
| 5,737,152 A | 4/1998 | Balakrishnan |
| 5,943,188 A | 8/1999 | Kazama |
| 5,995,328 A | 11/1999 | Balakrishnan |
| 6,069,774 A | 5/2000 | Arisaka |
| 6,282,064 B1 | 8/2001 | Palmer |

FOREIGN PATENT DOCUMENTS

| | | |
|---|---|---|
| JP | 09-305907 | 11/1997 |
| JP | 10-255238 | 9/1998 |
| JP | 11-016125 | 1/1999 |
| WO | WO 96/42080 | 12/1996 |

OTHER PUBLICATIONS

Nikkei Electronics, "Recording Density by MR Head Available at 5 Gbits/ (inch)", Apr. 6, 1998, pp. 155-165.

(Continued)

*Primary Examiner*—A. J. Heinz
(74) *Attorney, Agent, or Firm*—Mattingly, Stanger, Malur & Brundidge, P.C.

(57) ABSTRACT

Magnetic disk apparatus includes an electric wiring capable of satisfying an electric condition under which high frequency recording higher than or equal to 200 MHz, a magnetic head having at least a recording device to a magnetic recording medium, and also the electric wiring corresponding to a recording current supplying device to this magnetic head are formed on a suspension member for mechanically suspending the magnetic head, the recording current being supplied to a magnetic head recording device by employing such electric wiring, the characteristic impedance of which is higher than a maximum impedance of the magnetic head recording device.

2 Claims, 7 Drawing Sheets

OTHER PUBLICATIONS

Japanese Electronic Information Communication Institute Technical Research Report, "Jiki Kiroku", published Oct. 15, 1998, pp. 7-12.

Nikkei Electronics, Apr. 6, 1998, p. 168.

Japanese Applied Magnetic Institute, 22nd Lecture held in 1998.

IIB—IIB

IIIB—IIIB

DISK DRIVE HAVING MAGNETIC HEAD CONDUCTION PATHS WITH ARRANGEMENTS TO CONTROL IMPEDANCE

This is a continuation application of U.S. patent application Ser. No. 10/624,839, filed Jul. 23, 2003 (now U.S. Pat. No. 6,894,874), which is a continuation application of U.S. patent application Ser. No. 10/318,114, filed Dec. 13, 2002 (now U.S. Pat. No. 6,661,613), which is a continuation application of U.S. patent application Ser. No. 10/126,576, filed Apr. 22, 2002 (now U.S. Pat. No. 6,529,348), which is a continuation application of U.S. patent application Ser. No. 09/523,383, filed Mar. 10, 2000 (now U.S. Pat. No. 6,404,594).

BACKGROUND OF THE INVENTION

The present invention generally relates to a magnetic disk apparatus employed in a computer, an information processing apparatus, and so on. More specifically, the present invention is directed to a structure of a magnetic disk apparatus with employment of an electric wiring capable of satisfying an electric condition under which high frequency recording higher than or equal to 200 MHz can be realized in this magnetic disk apparatus.

As storage apparatuses of information processing appliances, semiconductor memories and magnetic member memories are mainly employed. In view of access time, semiconductor memories are employed as internal storage apparatuses, whereas in view of large memory capacities and non-volatile characteristics, magnetic member memories are employed as external storage apparatuses. Nowadays, magnetic disks and magnetic tapes are major materials of such magnetic member memories. As recording media employed in these magnetic disks/tapes, magnetic thin films are formed on either substrates or tapes.

Magnetic head recording (writing) elements having electromagnetic converting effects are used so as to write magnetic information on these recording media. Also, to reproduce (read) magnetic information, magnetic head reproducing elements are employed which may utilize the magneto resistive phenomenon, the giant magnetoresistive phenomenon, or the electromagnetic inductance phenomenon. These functional element units are provided on input/output parts called as magnetic heads.

Among these magnetic recording apparatuses, the present invention relates to a structure of a high frequency recording magnetic disk apparatus. More specifically, the present invention directs to an electric wiring itself of a magnetic head, and also a structure of a magnetic disk apparatus arranged by containing this electric circuit, and a magnetic head recording element unit, by which high frequency recording operation can be realized.

As to a major trend in high-performance magnetic recording aspects, these are one trend of a high recording density technique, and also another trend of a high frequency technique. This high recording density technique is described in, for example, Japanese magazine NIKKEI ELECTRONICS titled "Recording density by MR head available at 5 G bits/(inch)$^2$" issued on Apr. 6, 1998, pages 155 to 165. On the other hand, the high frequency technique is described in, for example, Japanese Electronic Information Communication Institute Technical Research Report "JIKI KIROKU" published on Oct. 15, 1998, pages 7 to 12.

It should be understood that the present invention is directed to a novel technique as to the latter-mentioned high frequency technique.

In the conventional magnetic storage apparatuses, frequencies used during recording operations and reproducing operations never exceed 100 MHz. However, in future, in high density magnetic recording apparatuses, data transfer performance achieved in these high density magnetic recording apparatuses must be increased higher than or equal to 50 MB/S, since a large amount of data should be input/output within a short time period. This data transfer performance of 50 MB/S defined in such a magnetic recording apparatus implies that a frequency range is increased higher than or equal to 200 MHz (50×8/2 Hz).

Within such a range that a recording frequency does not exceed 100 MHz, a twisted line is employed so as to electrically couple a magnetic head to an IC for controlling recording/reproducing operation. However, the twisted line owns such a problem that since this twisted line owns a large inductance component, a high frequency signal required for performing a high-speed recording operation can be hardly transmitted.

To solve this problem, for example, the suspension referred to as a "line-integral type suspension" is employed. This suspension is described in Japanese magazine NIKKEI ELECTRONICS issued on Apr. 6, 1998, page 168. In this suspension, the wiring lines used to supply the signals and the electric power are directly formed on the suspension. Since this suspension member is formed by way of the photo-etching manner, both the width between the wiring lines and the interval between two wiring lines can be made shorter than or equal to 30 $\mu$m. As a result, the inductances of the wiring lines can be suppressed smaller than or equal to 50 nH. Because of this effect the recording operation higher than or equal to 200 MHz may be realized in the magnetic recording apparatus with employment of the line-integral type suspension structure.

However, the wiring line is actually formed and is actually coupled to this wiring line. It could be revealed that a desirable high frequency recording operation could not be carried out in this actual case. This reason may be caused by the wavelengths of the high frequency components contained in the recording current. Therefore, in order to solve this problem, it is conceivable that the length of the electric wiring line should be shortened.

Figure 1:
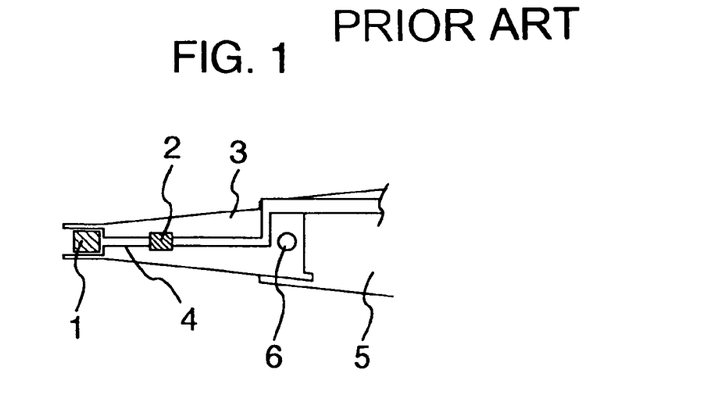
FIG. 1 is a conceptional drawing for illustratively representing the conventional suspension member.

FIG. 1 shows such an example of an improvement in the line-integral type suspension so as to solve the above-described problem. The read/write IC2 is provided on the suspension 3 in such a way that this read/write IC2 is approached to the magnetic head 1. In this drawing, reference numeral 4 is an electric wiring for supplying a signal and electric power, reference numeral 5 denotes an arm, and reference numeral 6 indicates a boss used to mount the arm. This conventional technique is referred to as a "Chip on Suspension" which is reported from, for example, Japanese Applied Magnetic Institute, 22nd Lecture held in 1998.

The technique for providing the read/write IC on the suspension located near the magnetic head so as to shorten the length of the electric wiring may be obvious from the above-described technical documents. When the read/write IC is mounted on such a member having a poor heat radiation characteristic, extension and/or distortion may occur due to heat, which may cause the performance of the magnetic disk apparatus to be deteriorated. Furthermore, there is another problem that mass is increased and a total number of electric wirings is increased, since the read/write IC is mounted on the mechanical movable unit. To solve these problems, newly considered solutions are necessarily required, but these solutions could increase the cost up aspect of the magnetic disk apparatus.

Also, one technical idea capable of uniforming impedances of transmission paths has been proposed in PCT Laid-open Publication No. WO96/42080. Even when such a proposed technical idea is employed, it is practically difficult to realize the high frequency recording operation. This technical propose may prevent the reflections occurred in the signal lines by uniforming the impedances of the transmission path, namely smoothing the impedance changes.

However, even when no reflection condition is made in the electric wiring by applying the above-explained technical method, if the impedance of the magnetic head cannot be matched with the impedance between the electric wiring, then the maximum reflection may occur at this mismatching portion, so that the electric length cannot be made long.

SUMMARY OF THE INVENTION

The performance of a storage apparatus may be determined by speeds during input/output operations and also by a storage capacity. In order to improve product competitiveness, access time should be shortened and a storage capacity should be increased. In order to satisfy this requirement, in general, the line-integral type suspension in which the wiring line is directly formed on the suspension is utilized.

However, as previously explained, even when the electric wiring is merely formed on the suspension, it can be apparent that this structure is not suitable for the high frequency recording operation.

An object of the present invention is to provide a magnetic disk apparatus capable of realizing a high frequency recording operation operable higher than or equal to 200 MHz without increasing a cost-up aspect, while disclosing a novel structure of an electric wiring for a magnetic disk, and also a novel construction of a magnetic head recording unit.

BRIEF DESCRIPTION OF THE DRAWINGS

A more better understanding of the present invention may be made by reading a detailed description in conjunction with the accompanying drawings, in which.

DESCRIPTION OF THE EMBODIMENTS

The present invention will now be described in detail with reference to various preferred embodiments thereof.

Figure 2A:
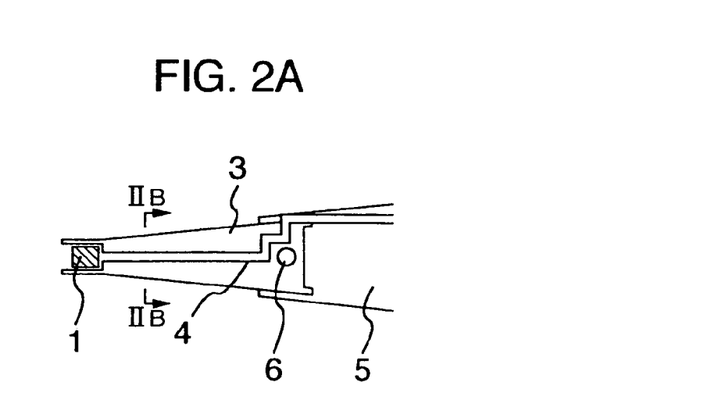
FIG. 2A is a conceptional diagram for illustratively showing a major portion of an insulating type suspension capable of realizing the present invention.
Figure 2B:
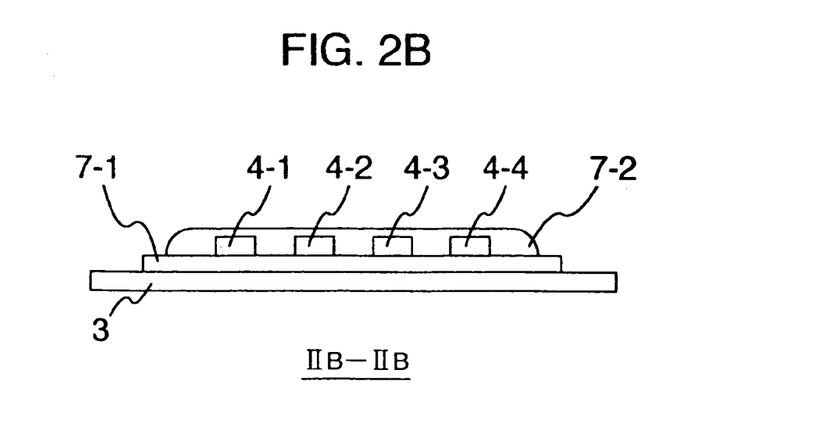
FIG. 2B is a sectional view indicated by the arrows IIB—IIB on FIG. 2A.
Figure 3A:
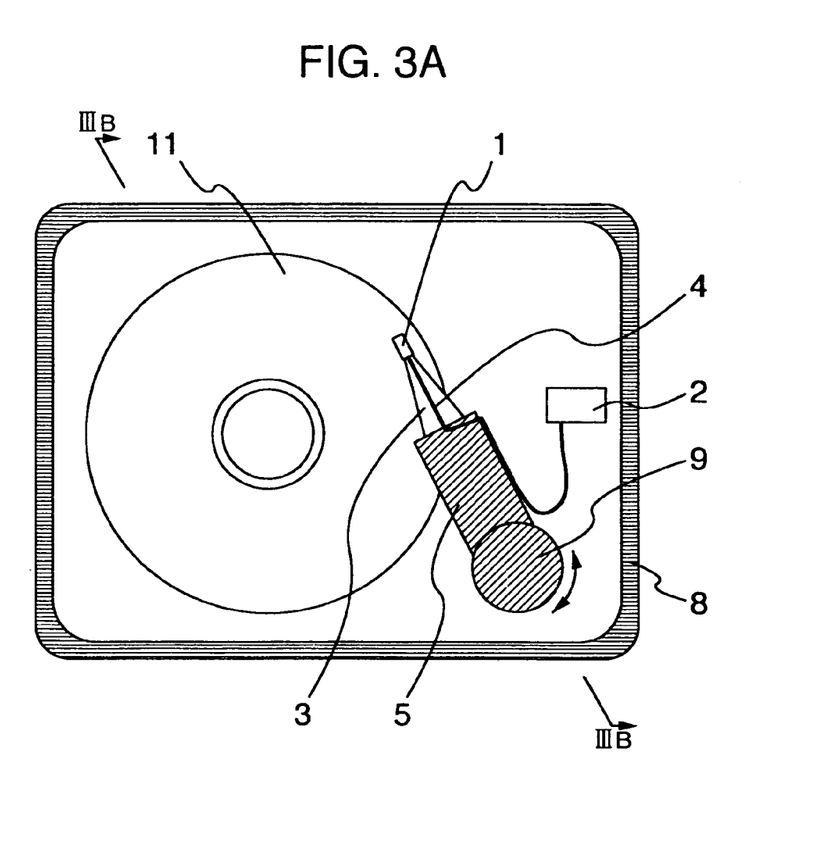
FIG. 3A is a first conceptional diagram for illustratively indicating a magnetic recording apparatus according to the present invention.
Figure 3B:
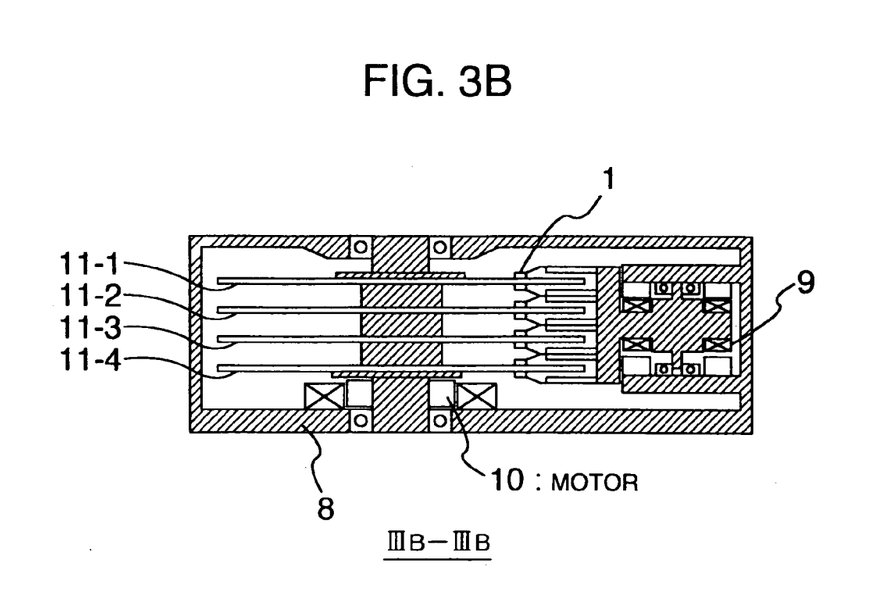
FIG. 3B is a sectional view indicated by the arrows IIIB—IIIB on FIG. 3A.

Referring now to FIG. 2 and FIG. 3, a first embodiment of the present invention will be explained. FIG. 3 is a conceptional diagram for illustratively indicating a write unit of a magnetic disk apparatus for embodying the present invention. The write unit shown in FIG. 2 is constituted by a magnetic head 1, suspension 3, an arm 5, and an electric wiring 4. The magnetic head 1 converts electric information into magnetic information, and furthermore, realizes a read operation. The suspension 3 mechanically suspends the magnetic head, and produces depressing weight against a magnetic recording medium. The arm 5 supports this suspension 3. The electric wiring 4 functions as an electric signal transferring unit to the magnetic head. The electric wiring 4 is connected to a read/write IC for inputting/outputting an electric signal and for executing a signal process operation. This read/write IC is identical an IC2 shown in FIG. 3, and will be simply referred to as an "R/W IC" hereinafter.

As indicated in FIG. 3, various setting positions for an R/W IC2 may be conceived. That is, this R/W IC2 may be positioned on a circuit board which is fixed on a housing of a magnetic disk apparatus, on a rotary actuator, or on an arm. The present invention is not limited only to these setting positions except for a specific case. In FIG. 3, reference numeral 11 shows magnetic recording media, reference numeral 9 indicates a rotary actuator, reference numeral 4 represents an electric wiring, reference numeral 5 indicates an arm, reference numeral 3 denotes suspension, and reference numeral 8 shows a case.

As indicated in FIG. 2A, the electric wiring 4 is formed on the suspension 3. The electric wiring 4 is made of an electric-conductive metal, and is protected by employing an insulating film in order to maintain an electric-insulating condition with respect to the suspension and other metal parts.

This structure is indicated in FIG. 2B. That is, FIG. 2B is a sectional view for indicating this structure, taken along a line IIB—IIB of FIG. 2A. The suspension 3 is manufactured by employing stainless steel having a thickness of 25 $\mu$m. Then, polyimide resin 7-1 having a thickness of 20 $\mu$m, which will constitute an insulating film, is covered on this stainless steel, and the electric wiring 4 is formed thereon. A width of each of these electric wirings 4-1, 4-2, 4-3, and 4—4 is selected to be 5.4 $\mu$m, and a thickness of each of these electric wirings is selected to be also 5.4 $\mu$m. A film structure of the electric wiring 4 is Au/Ni/Cu/Cr.

To electrically and mechanically protect these electric wirings, polyimide resin 7-2 having a thickness of 10 $\mu$m is finally stacked. The relative dielectric constant of the above-employed polyimide resin is equal to approximately 3.3.

Figure 4:
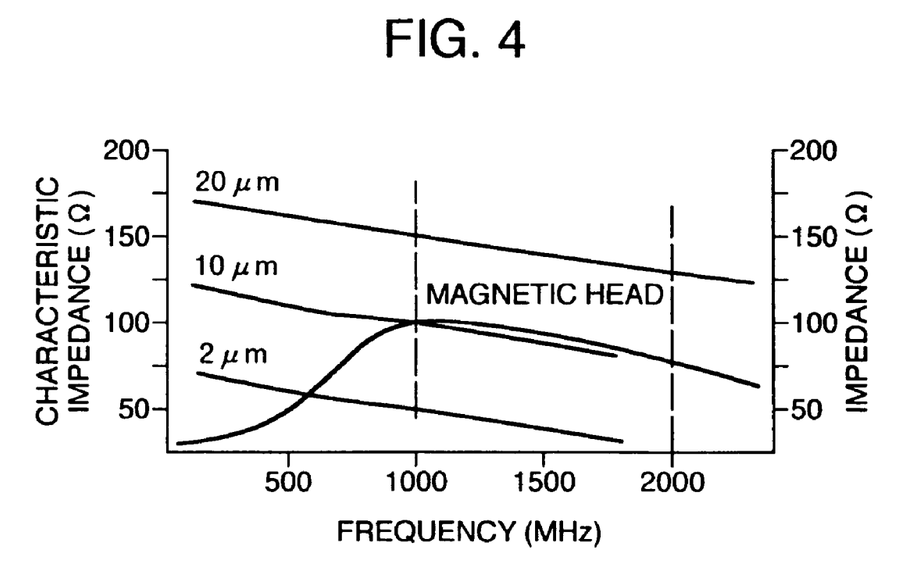
FIG. 4 is a graphic representation for representing a basic measurement result of the present invention.

FIG. 4 graphically shows a measurement result in such a case that a characteristic impedance of an electric wiring path having the above-explained structure is measured. This measurement result shown in FIG. 4 indicates a characteristic impedance of an electric wiring path when the film thickness of the polyimide resin 7-1 shown in FIG. 2 is selected to be 10 μm in combination with another characteristic impedance of another electric wiring path when the film thickness of the polyimide resin 7-1 is selected to be 2 μm. As apparent from any of these measurement results, there is such a trend that the characteristic impedance is decreased in connection with an increase of a frequency. While the frequency is fixed to 1 GHz, when the measured values of the characteristic impedances are compared with each other, the following impedance values are obtained. When the film thickness of the polyimide resin is selected to be 20 μm, the characteristic impedance becomes 150 ohms. When this film thickness of the polyimide resin is decreased to 10 μm, the characteristic impedance becomes 100 ohms. When the film thickness of the polyimide resin is further decreased to 2 μm, the characteristic impedance becomes 50 ohms. As apparent from the foregoing description, the characteristic impedance of the electric wiring path is lowered, while the film thickness of the polyimide resin is decreased.

Next, these measurement results are compared with a change in impedances of a magnetic head used in this embodiment. In FIG. 4, this change in the impedances of the magnetic head is jointly indicated. As apparent from this graphic representation, the impedance of the magnetic head becomes maximum, namely 100 ohms near the frequency of 1 GHz, and the higher the frequency is increased, the smaller the impedance of the magnetic head is decreased.

When this change is compared with the change in the characteristic impedance of the electric wiring path, in such a case that the film thickness of the polyimide resin is selected to be 20 μm, the characteristic impedance of the electric wiring path exceed the impedance of the magnetic head under all frequency conditions. However, when the film thickness of the polyimide resin is selected to be 10 μm, the frequencies where the characteristic impedance of the electric wiring path exceed the impedance of the magnetic head are limited lower or equal to than approximately 1 GHz at which the impedance of the magnetic head becomes maximum. Furthermore, when the film thickness of the polyimide resin is selected to be 2 μm, the frequencies where the characteristic impedance of the electric wiring path exceeds the impedance of the magnetic head are limited lower or equal to than approximately 600 MHz, namely the low frequency condition.

In order to further investigate a relationship between the characteristic impedance owned by the above-explained electric wiring path and the impedance of the magnetic head recording element portion, rise time of a current was measured by connecting the magnetic head to each of the electric wirings.

Figure 5:
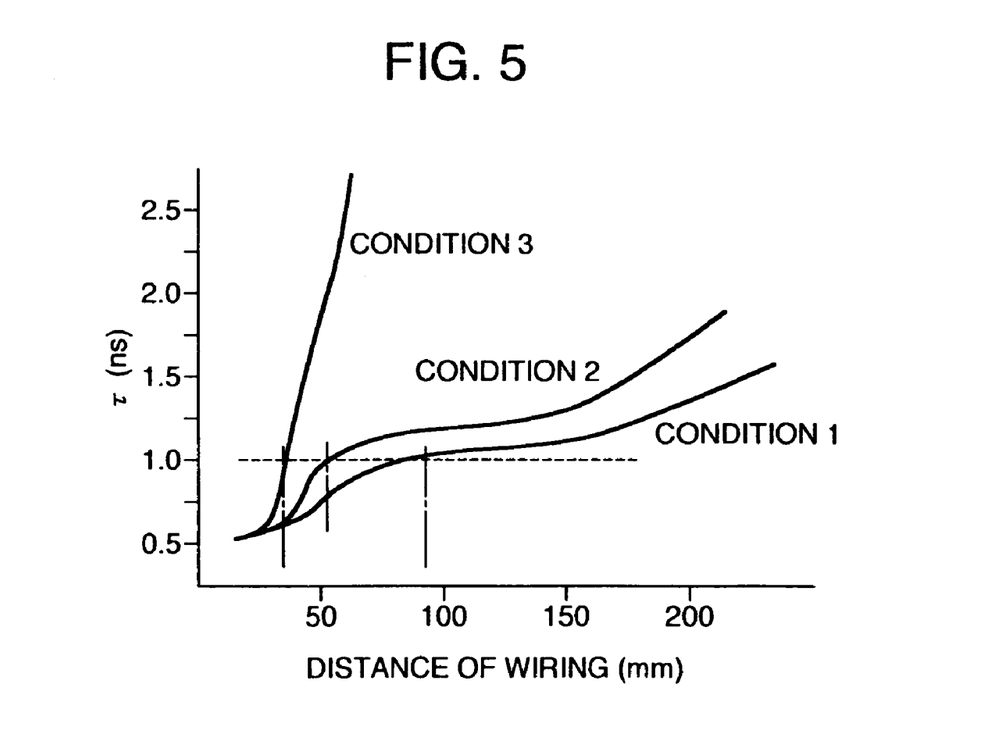
FIG. 5 is a graphic representation for representing a measurement result of rise time "τ" of a recording current.

FIG. 5 graphically represents a measurement result of rise time "τ" of this recording current. This rise time "τ" corresponds to time during which an amplitude of this current is reached from 10% up to 90%. While the lengths of the respective electric wirings are varied, changes in the rise time "τ" are measured with respect to the changes in these lengths. While the R/W IC is connected to the input side of each of the electric wirings, the rise time "τ" is measured at the current input terminal of the magnetic head. For example, the following confirmation could be made. That is, a current pulse of rise time "τ" nearly equal to 0.5 ns (namely, rise time "τ" at output terminal) is outputted from the R/W IC employed in this rise time measurement.

When the measurement results shown in FIG. 5 are studied, the following fact can be seen. When the film thickness of the polyimide resin is 20 μm, namely when the characteristic impedance of the electric wiring path exceeds the impedance of the magnetic head recording element portion under all of the frequency conditions (condition 1), even if the length of the electric wiring path is made long, then the rise time "τ" of the current pulse which is entered into the magnetic head recording element portion is substantially equal to 1.5 ns, namely there is a small influence. Also, when the film thickness of the polyimide resin is 10 μm, namely when the characteristic impedance of the electric wiring path is smaller than the maximum impedance of the magnetic head recording element portion (condition 2), the rise time "τ" is kept within approximately 2.0 ns. However, it can be seen that the change in the impedance is slightly large, as compared with that of the condition 1.

On the other hand, when the film thickness of the polyimide resin is 2 μm, namely in such a case that the characteristic impedance of the electric wiring path exceeds the impedance of the magnetic head recording element portion only in the low frequencies lower or equal to than the frequency 600 MHz (condition 3), the rise time "τ" is extremely increased in connection with the increase of the electric wiring length, and is rapidly deteriorated.

As can be readily understood from the above-explained measurement result, the smaller the value of the characteristic impedance becomes, and also the longer the length of the electric wiring path becomes, the rise time "τ" is prolonged. This trend may occur, while a loss appears in the electric wiring path. However, it can be seen that there is a very small change in the rise time "τ" under either the condition 1 or the condition 2, as compared with that of the condition 3. As a consequence, this phenomenon may be conceived that the problem caused by the loss in the electric wiring path can be avoided by other factors. The reason why such a phenomenon occurs may be understood as follows:

That is, the magnetic recording unit of the magnetic head is constructed of a coil. Therefore, this magnetic recording unit may electrically constitute an inductive load. As a result, it is conceivable that the impedance of the recording element unit of the magnetic head is uniformly increased in combination with increasing of the frequency. However, since the magnetic film of the actual magnetic head owns the frequency characteristic and induces the magnetic field produced from the coil, there is such a trend that the impedance is decreased under high frequency condition. The frequency characteristic of this magnetic film is caused by such that the permeability of the magnetic film for constituting the magnetic head is varied in response to the frequency, and caused by the adverse influence of the eddy current flowing through this magnetic film. As a consequence, the impedance of the magnetic head owns the maximum impedance value.

It is practically difficult that the magnetic head with such an impedance change is electrically matched with the electric wirings with the different characteristic impedance changes. As a result, reflections may occur at mismatching portions, which may produce waveform distortions. Also, this waveform distortion becomes conspicuous, because the longer the length of the electric wiring path is made, the larger the phase sift of the high frequency component is increased.

Such a fact that the rise time "τ" is shortened, namely the signal has the same waveform when being outputted from the R/W IC implies that the waveform distortion is avoided.

It can be concluded that the reflections should be avoided in order to reduce the waveform distortion.

Such a fact that the characteristic impedance of the electric wiring is increased by the maximum impedance of the magnetic head, implies such a fact that the characteristic impedance of the electric wiring path is increased by the impedance of the magnetic head under all of the frequency conditions. This implies such a phenomenon that the magnetic head can be hardly seen as the electric load from the side of the R/W IC. As a consequence, the following fact may be conceived. That is, the adverse influence caused by the mismatching phenomenon occurred at the connection point between the electric wiring and the magnetic head recording element portion can hardly appear. As a result of this effect, the margin of the rise time "τ" with respect to the electric wiring path length is increased.

It should be readily understood that the rise time "τ" corresponds to a very important parameter required when the magnetic head is switched in a high speed switching operation, and this rise time "τ" should be located within a recording time period for 1-bit information.

Under such recording frequencies higher than or equal to 200 MHz directed to the present invention, the recording magnetic field must be switched with 2.5 ns. In the case of the magnetic head recording element unit as explained in this embodiment, the rise time "τ" is required to be set within approximately 1 ns, while considering a time delay defined after the input of the current up to the generation of the magnetic field. Generally speaking, a time delay defined after an input of a current up to a generation of a magnetic field may depend upon a structure of a magnetic head, and an amplitude of a current.

When the measurement result shown in FIG. 5 is investigated, under such a condition (namely, condition 1) that the characteristic impedance of the electric wiring path exceeds the impedance of the magnetic head recording element unit under all of the frequency conditions, even when such an electric wiring path having a length of approximately 80 mm is employed, it can be seen that this purpose can be satisfied. Also, the following facts may be revealed. That is, under such a condition (condition 2) that the characteristic impedance of the electric wiring path cannot be made equal to the maximum impedance of the magnetic head recording element unit, the length of the electric wiring path is limited within 50 mm. Furthermore, under such a condition (condition 3) that the characteristic impedance of the electric wiring path becomes smaller than the impedance of the magnetic head recording element unit, the length of the electric wiring path is limited within 20 mm.

It may be easily understood that the longer the distance between the magnetic head and the R/W IC can be made, the easier the R/W IC can be mounted. In other words, if the length of the electric wiring path can be made long, then the R/W IC need-not be approached to the arm and the suspension (namely, movable portion), and further, the magnetic head. As a result, it is possible to avoid such problems that heat is produced from the R/W IC when this R/W IC is positioned near the magnetic head, mass or the movable portion is increased, and a total number of electric wirings used to drive the R/W IC is increased. As a consequence, the high frequency recording performance can be achieved from this effect, while maintaining both the productivity and the apparatus cost.

As apparent from the above-explained measurement result, the above-explained feature owned by the electric wiring path having the higher characteristic impedance (disclosed in the present invention) may depend upon such a relationship between this characteristic impedance of the electric circuit path and the impedance of the magnetic head recording element unit. This may be understood as such an effect achieved by making the characteristic impedance of the electric circuit path higher than the impedance of the magnetic head recording element portion. It should also be noted that in the above-explained embodiment, this relationship is defined within all of the frequency ranges. Even when this relationship is limited to a narrower frequency condition so as to realize the present invention, a substantially same effect could be achieved. This example will now be described as a second embodiment.

The second embodiment is directed to a higher harmonic component contained in a recording current. In general, a recording current is a rectangular pulse having a trapezoidal shape, and this rectangular pulse contains high frequency components. Generally speaking, a frequency component used to define rise time "τ" among these high frequency components may be obtained from $0.35/\tau$. However, the following fact could be recognized from this second embodiment. That is, when a precise calculation is carried out, there are large numbers of errors. In order to represent "rise time τ being nearly equal to 1 ns" is precision shorter than, or equal to ±0.1 ns, a higher frequency component of $1/\tau$ must be considered. This rise time "τ" is required so as to realize high frequency recording of 20 MHz.

Figure 10:
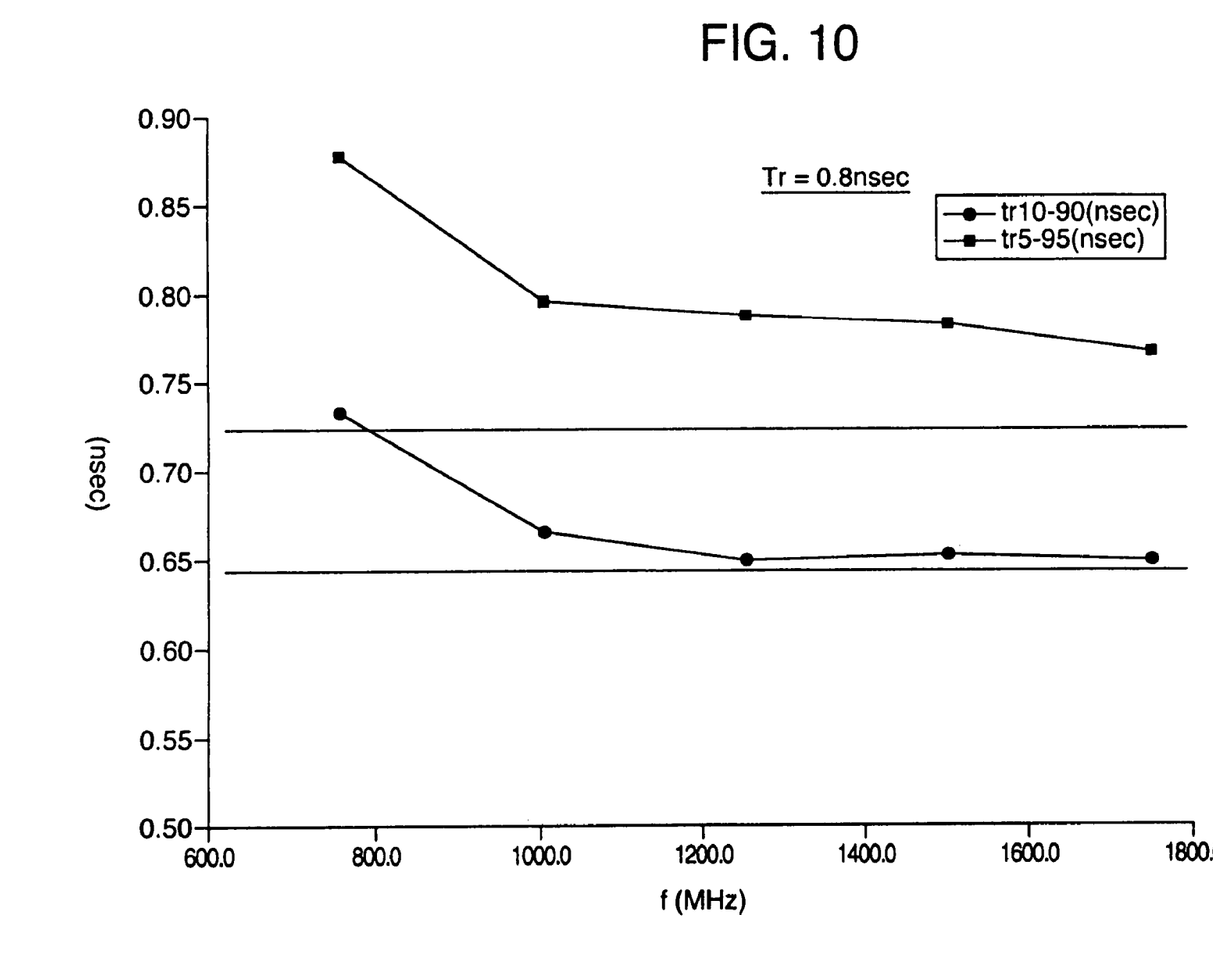
FIG. 10 is a graphic representation for representing a calculation result used to calculate a change in the rise time "τ".

FIG. 10 graphically shows an example of a calculation executed in order to acquire an influence degree of the above-explained higher harmonic component. This calculation method is carried out as follows. That is, after a trapezoidal pulse having rise time of 0.8 nsec is Fourier-transformed so as to extract a frequency component contained in this trapezoidal pulse, and components higher than or equal to an arbitrary frequency are intentionally deleted from the extracted frequency component, namely the higher harmonic component is cut. Thereafter, the remaining pulse component is inverse-Fourier-transformed to thereby acquire a change in rise time.

An abscissa of this figure indicates a lower limit value of the cut higher harmonic component in the unit of MHz, and an ordinate thereof shows rise time of the inverse-Fourier-transformed pulse waveform in the unit of nanosecond (nsec). There are two different definitions as to rise time "τir", namely a time period defined from 10% to 90%, and another time period defined from 5% to 95%. These two different definitions are described in FIG. 10.

When the measurement result is investigated, it can be seen that the higher the frequency is cut, the smaller both the rise time "τir 5–95%" and the rise time "τir 10–90%" are decreased, while reducing the deterioration of the waveforms. In particular, when the frequencies higher than, or equal to 1,250 MHz are cut, there is a saturation trend in a change in the rise time "τir". Also, the frequencies higher than or equal to this specific frequency do not constitute important factors used to save the rise time "τir" of the original waveform. This specific frequency of 1,250 MHz is such a frequency calculated from an inverse number of the rise time of the trapezoidal pulse, namely 1/0.8 nsec. In other words, the deformation of the original waveform may be suppressed by such a manner that the frequency components may pass therethrough, in which the frequency calculated from the inverse number of the rise time is selected to be the upper limit frequency.

When the frequency component calculated from the conventional idea of $0.35/\tau$ is applied to this calculation example, an upper limit value of a conceivable frequency becomes 437 MHz. This frequency value is located outside a left frame of FIG. 10 and when the calculation result is externally interposed, it can be seen that a difference between the waveform and the original waveform is considerably extended.

In order that the high frequency recording higher than, or equal to 200 MHz can be achieved from this calculation result, in such a case that the rise time "τ" is required to be set within 1 ns, the high frequency components higher than, or equal to 1 GHz must be considered. As a result, in this second embodiment, the characteristic impedance of the electric wiring path is made larger than the impedance of the magnetic head under all of the frequency conditions higher than or equal to 1 GHz.

In this second embodiment, as to the rise time "τ", the similar result of that of the above-explained first embodiment could be similarly achieved. The effects confirmed in this second embodiment could be firstly revealed in accordance with the present invention. This effect is given as follows: In the case that the electric wiring having the high characteristic impedance is employed, the deterioration of the rise time "τ" is reduced also when the length of the electric wiring path is prolonged, as compared with such a case that the electric wiring having the low characteristic impedance is employed. Based upon this effect, even under such a condition that the R/W IC is located apart from the magnetic head recording element unit, the high frequency recording operation, namely the high-speed recording operation can be achieved. There is a great merit in view of the productivity technical aspect.

Similar to the second embodiment, a third embodiment is featured by that the present invention is applied to a specific frequency condition. As previously explained, such a frequency component that the frequency indicated by 1/τ is set as the upper limit frequency may give the influence to the rise time "τ" among the higher harmonic frequency components contained in the recording current. As a consequence, in accordance with this third embodiment, in order to reduce a change in rise time "τ", while such a frequency of "1/τ" is considered, a relationship between a characteristic impedance of an electric wiring path and an impedance of a magnetic head recording unit is defined. Concretely speaking, the characteristic impedance of the electric wiring path can become higher than the impedance of the magnetic head at such a frequency of 1,250 MHz (namely, 1/τir) in order that τir=0.8 nsec can be realized. In comparison with the second embodiment, there is only such a difference that the relationship between these characteristic impedance and impedance is restricted to a specific frequency condition.

Also, in this third embodiment, there is a similar effect to that of the above-explained second embodiment. Namely, the length of the electric wiring could be made long. As a specific feature, since the frequency is specified as "1/τ", there is such a merit that fluctuations among such magnetic heads having the same impedances can be reduced. In this case, the fluctuation implies a fluctuation in voltages appearing across input terminals of a magnetic head, and also a fluctuation in rise time "τ".

In the above-explained third embodiment, the magnetic head recording element unit is employed, the inductance of which is lower than or equal to 40 nH. This condition is caused by such a fact that the characteristic impedance of the electric wiring path is limited. The characteristic of the electric wiring path may be calculated from (inductance per unit length/capacitance per unit length)$^{1/2}$, assuming now that the electric wiring path is approximated to no loss. In order to increase the characteristic impedance, this inductance per unit length may be increased whereas the capacitance per unit length may be decreased. As is known, the inductance may be increased by widening the interval between the electric wiring paths. In order to reduce the capacitance, the width of the electric wiring path must be made narrower, or the material having the lower dielectric constant must be employed in the insulating layer. An allowable range is apparently determined when the interval between the electric wiring paths is widened, due to such a geometrical dimensional relationship among a plurality of suspension for constituting this interval.

On the other hand, as to the measure for narrowing the width of the electric wiring path so as to reduce the capacitance, an allowable range is apparently defined due to the following necessities. That is, a current on the order of several tens mA must be supplied in order to drive the magnetic head (in order to produce a magnetic field by a magnetic head having a low inductance). Also, in order to lower the relative dielectric constant of the dielectric member, an available range thereof is defined in view of a physical characteristic of a material (assuming now that dielectric constant of even air is 1).

When the above-described conditions are considered, the adjustable range of the characteristic impedance is selected from approximately 50 ohms to 150 ohms. Under such a condition of the electric wiring path, the usable impedance range of the magnetic head becomes smaller than or equal to approximately 40 nH (in this third embodiment, it becomes maximum impedance value of 150 ohms).

In the magnetic disk apparatus according to the present invention, the maximum recording frequency is at least higher than or equal to 200 MHz. The reason is given as follows. That is, as is known in this field, the above-explained reflection problem in the high frequencies may become conspicuous when a ¹⁄₁₀-length (or ⅛-length) of a wavelength (propagation speed) of a frequency component under consideration is made shorter than the electric wiring path length. At a frequency of 200 MHz, one time period becomes 5 ns. Within this time period, a signal is propagated over a distance of approximately 75 mm if such a stripe line having a dielectric constant of approximately 3.3 is employed. At a frequency of 100 MHz, a signal is propagated over a distance of 150 mm. Since the length of the electric wiring path used in the conventional magnetic disk apparatus is selected to be approximately 85 mm to 150 mm, if the frequency becomes lower than, or equal to 100 MHz, then there is no problem.

However, when the frequency is increased up to 200 MHz, the length of the electric wiring path is required to be shortened within 75 mm. However, when the electric wiring path condition disclosed in the present invention is satisfied, as indicated in FIG. 5, the signal can be propagated through the electric wiring path having the length longer than or equal to 75 mm even at the recording frequency of 200 MHz. Because of this effect, the R/W IC need not be mounted on the movable unit. As a result, the magnetic disk apparatus according to the present invention can employ a similar structure to that of the conventional magnetic disk apparatus, the low cost apparatus can be developed. Since such a merit can be realized, it is possible to realize such a magnetic disk apparatus having a higher product competitiveness.

In the present invention, the subject characteristic impedance "$Z_0$" is given as follows:

$$Z_0 \approx (L_0/C_0)^{0.5}$$

where symbols "$L_0$" and "$C_0$" may be determined based upon an inductance per unit length, and a capacitance per unit length.

Since the electric wiring path of the magnetic disk apparatus is a round path, a capacitance appears between signal lines and the characteristic impedance $Z_0$ does not become infinitive. As an electric wiring path having a large characteristic value $Z_0$, a feeder line (distance between signal lines is approximately 1 cm) is known in this technical field. However, the characteristic impedance of this feeder line is equal to about 300 ohms. If an electric wiring path having a characteristic impedance larger than this 300 ohms is made, then this path must own such a shape that a distance between round signal paths is extremely separated from each other. As a result, the upper limit value of the characteristic impedance as defined in the magnetic disk apparatus according to the present invention is nearly equal to 300 ohms, which is conceivable by any person who is skilled in the electric field.

Also, the upper limit value of the characteristic impedance is restricted by a voltage of a power supply. The restriction will now be explained in detail. A product between the inductance "$L_0$" used to determine the characteristic impedance and the length "1" of the transmission path is equal to all of inductance amounts owned by the electric wiring path. When this inductance amount is added by the inductance "Lh" of the magnetic head, an inductance amount of a load as viewed from the R/W IC for supplying the recording current may be calculated. Assuming now that a recording current of 200 MHz is supplied from the R/W IC, the rise time of this recording current must be set within 1.25 ns at minimum time. Now, when the magnitude of the recording current is assumed as 40 mA, ideally speaking, the power supply voltage "E" of the R/IC must satisfy the following formula:

$$E > (L_0 \times 1 + Lh) \times 40 \times 10^{-3} / 1.25 \times 10^{-9}$$

On the other hand, there is such a trend that a voltage of a power supply is lowered in view of high-speed operation as well as low power consumption of an IC. Therefore, presently available ±5V to ±3V should be employed as the power supply voltage. Considering this restriction, the inductance ($L_0 \times 1 + Lh$) never exceeds 200 nH.

Now when the inductance of the magnetic head is estimated as 40 nH, an inductance of an electric wiring path may be defined as approximately 160 nH. To calculate the upper limit value of the characteristic impedance from this inductance value, the following assumption should be made with respect to a capacitance of an electric wiring path per unit length and also a length of this electric wiring path. The capacitance of the electric wiring path per unit length is restricted by a shape of such an electric wiring path applicable to the above-explained magnetic disk apparatus, namely, limited to approximately 200 pF/m. Assuming now that the length of the electric wiring path is equal to 10 (5) cm, the characteristic impedance $Z_0$ may be calculated as approximately 89 (126) ohms by using the above-explained calculation formula.

These values become lower values than the upper limit value restricted by the above-explained shape of the electric wiring. In any case, it can be understood that the characteristic impedance owns the predetermined upper limit value.

To furthermore clarify the features of the present invention, a fourth embodiment will now be explained.

In order to realize the high frequency recording operation, the high frequency recording current is required to be supplied to the magnetic head. To realize this high frequency recording operation, one method has been proposed. That is, the R/W IC is installed on the suspension so as to reduce the inductance of the electric wiring path. However, as previously explained, this method may cause the following problems. That is, the positional precision is deteriorated, since the heat amount produced from the IC and the mass thereof are increased, and furthermore, the head seek speed is lowered. Furthermore, there are other problems as to the manufacturing aspect, since the R/W IC is mounted on the suspension having low mechanical rigidity. That is, the manufacturing cost is increased, and the difficult quality control is required.

Figure 6:
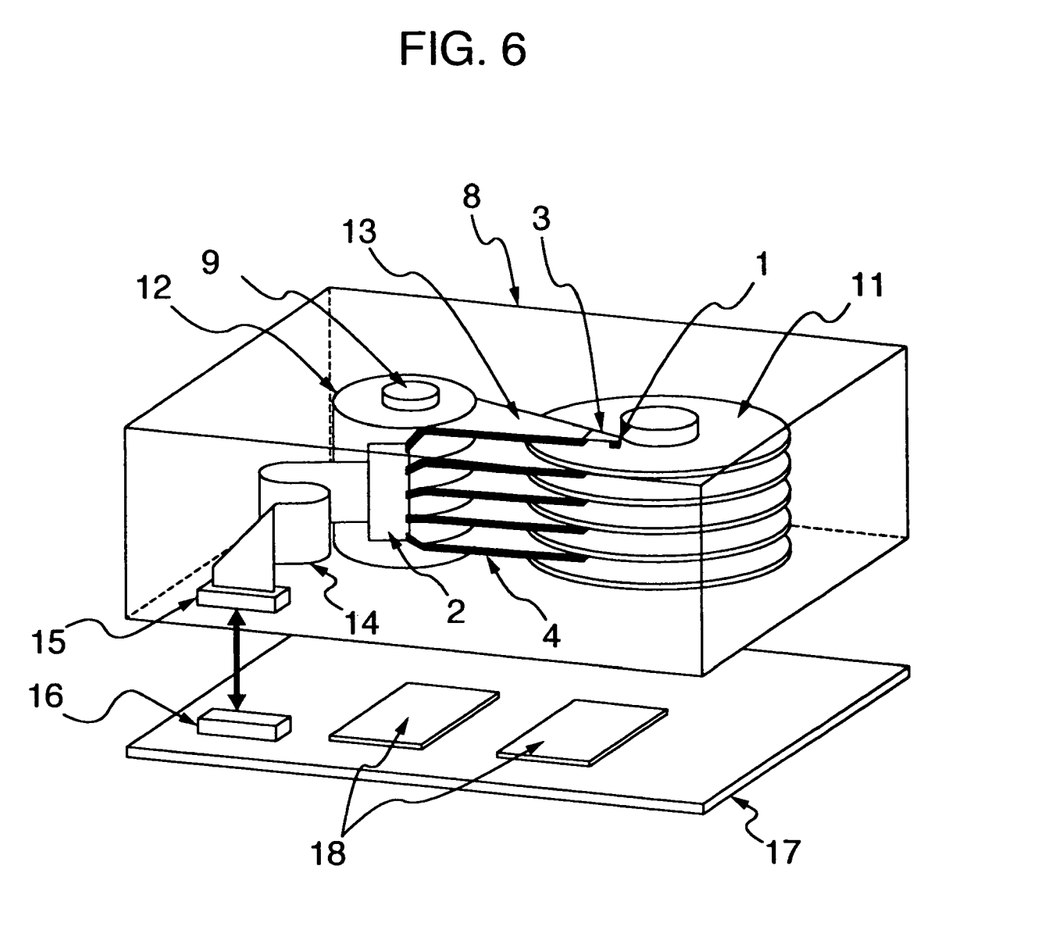
FIG. 6 is a second conceptional diagram for illustratively showing a magnetic recording apparatus according to the present invention.

To the contrary, such a problem never occurs by employing a method for mounting an R/W IC on a carriage as shown in FIG. 6. In other words, since the mass-increased portion of this carriage with employment of the R/W IC is located near the drive portion for producing torque, a small adverse influence is given to the deterioration in the positional precision and also lowering of the head seek speed. Also, since the carriage portion owns high mechanical rigidity, no specific care should be taken to destroy while the magnetic head apparatus is manufactured. Because of these reasons, the manufacturing cost is not increased, but also there is no problem related to the production such as difficulties of quality controls.

Referring now to FIG. 6, a description will be made of an example of a magnetic head to which the present invention is embodied. This magnetic head apparatus contains magnetic recording media (magnetic recording disks) 11, and is equipped with a constructional member. This constructional member is constructed by a magnetic head 1 for inputting/outputting magnetic information into/from the magnetic recording media, suspension 3 for suspending the magnetic head and for locating this magnetic head opposite to the magnetic recording media under predetermined weight condition, and the arm 5 for mechanically supporting the suspension. Furthermore, a mechanism unit is arranged by a carriage 12 for bundling a plurality of arms to hold these bundled arms, and a rotary actuator 9 for driving the carriage. As apparent from the foregoing description, the electric wiring path 4 which may give the restriction to the characteristic impedance value is mounted on both the suspension 3 and the arm 5.

Since the R/W IC2 is installed on the carriage 12 and is located near the actuator 9 for producing torque even when the mass is increased by mounting this R/W IC2, there is a very small adverse influence given to the deterioration of the positioning precision and also to lowering of the head seek speed.

The frequency of the signals supplied from the R/W IC2 to an electric cable 14 is lowered by employing the parallel mode means. The signals of the signal cable 14 are entered via connectors 15 and 16 into a circuit board 17. An IC circuit 18 for processing the signals is mounted on the circuit board 17, by which a similar electric signal processing operation to that of the conventional IC circuit is carried out. The above-explained members are stored in a case 8.

In this fourth embodiment, a high frequency recording current may flow between the magnetic head 1 and the R/W IC2. Since the electric wiring path between this magnetic head 1 and the R/W IC2 owns the characteristic impedance as explained in the present invention, the electric length of this electric wiring path which is restricted by the propagation speed can be made longer. Because this effect can be achieved, the R/W IC can be set to such a position by which various problems can be solved. Namely, these problems are related to heat, mass, and the manufacturing method.

As apparent from the above-explained descriptions, the above-explained features owned by such an electric wiring path having the characteristic impedance disclosed in the present invention will depend upon a relationship between this characteristic impedance and the impedance of the recording element of the magnetic head. This relationship may be extended to another relationship between a read element 22 of a magnetic head (see FIG. 7) having a different impedance characteristic and the electric wiring, which may be readily understood by any person who is skilled in the electric field.

Figure 7:
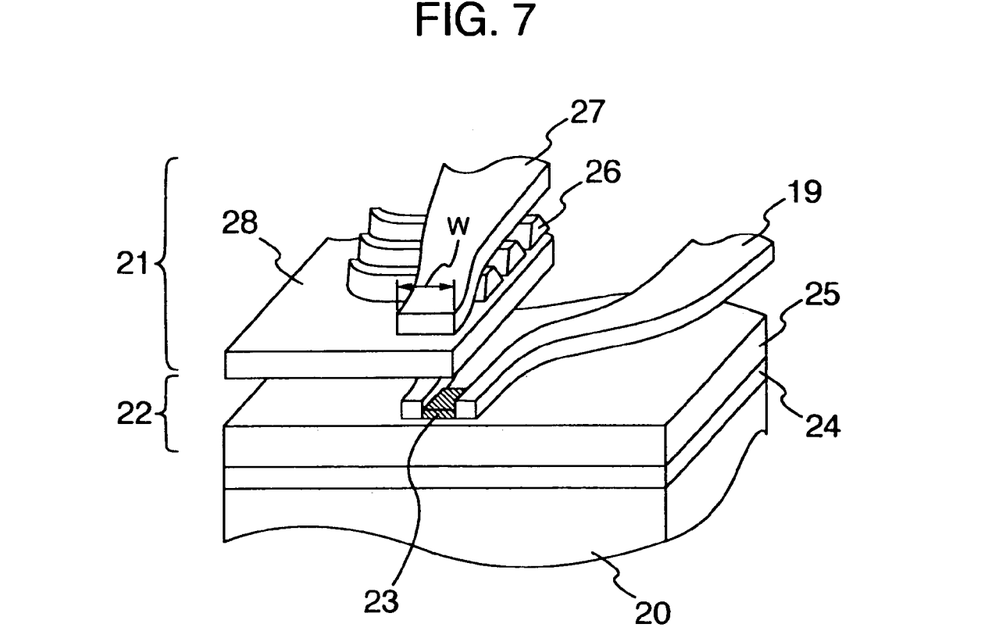
FIG. 7 is a conceptional diagram for illustratively indicating a magnetic head element.

The read element 22 is constructed of an electrode 19, and a thin-film magneto resistive device 23. This electrode 19 supplies a current to this thin-film magneto resistive device 23, and further detects a change in resistance values. This read element 22 is wrapped by metal shields 25 and 28 (see FIG. 7). Because of this shielding influence, there are many cases that the reading element owns the capacitive characteristic, as compared with the recording element. As a result, it is required to made the electric wiring having the capacitive characteristic in order to match the impedance of the electric wiring with the impedance of the reading element so as to realize the high frequency recording operation. In FIG. 7, reference numeral 20 shows a substrate of a magnetic head, reference numeral 21 is a write element, reference numeral 24 shows a lower layer, reference numeral 26 represents a spiral coil, reference numeral 27 indicates an upper magnetic pole, and reference numeral 28 denotes a lower magnetic pole which may function as a shield during reading operation.

Figure 8A:
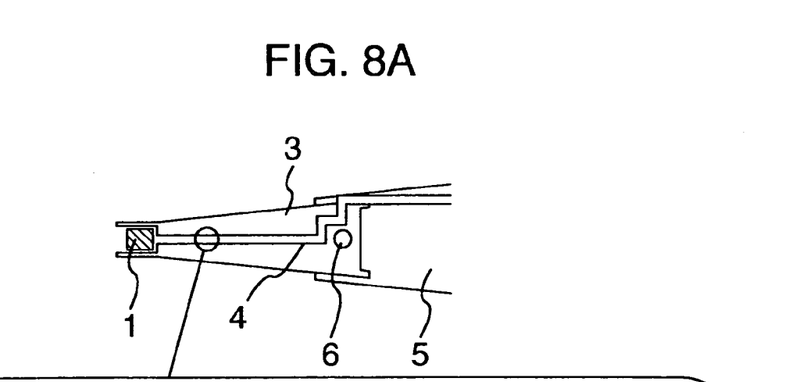
FIG. 8A is a conceptional diagram for illustratively representing indicated by a circle on FIG. 8A showing major portion of insulating type suspension.

FIG. 8A illustratively shows another embodiment to which the present invention is applied. As indicated in this drawing, an electric wiring 4 is arranged by a read wiring 200 (constructed of read wirings 4-3 and 4—4), and a write wiring 201 (constructed of write wirings 4-1 and 4-2). Similar to the above-explained embodiment, these read/write wirings 200/201 are formed on the suspension 3. These electric wirings 200 and 201 are constructed of conductive metals, and are protected by employing an insulating film from other metal parts in order to maintain electric insulating conditions.

Figure 8B:
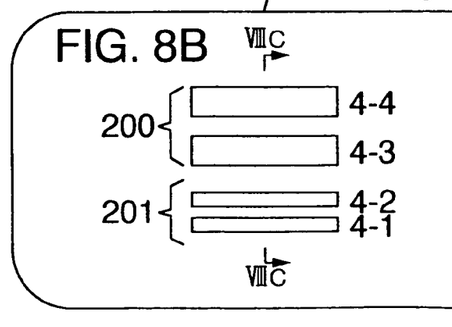
FIG. 8B is an enlarged view a pair of read wirings, capable of realizing the present invention.
Figure 8C:
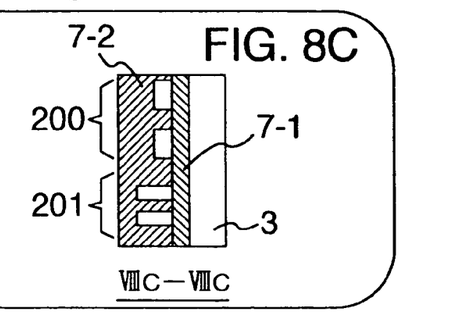
FIG. 8C is a sectional view indicated by the arrows VIIIC—VIIIC on FIG. 8B.

The form of this read wiring 200 is indicated in a sectional view VIIIC—VIIIC at a lower portion of FIG. 8B. That is, both a circuit width and a thickness of this read wiring 200 are made different from those of the write wiring 201. Concretely speaking, the width of this read wiring 200 is selected to be 10 $\mu$m, and the thickness thereof is selected to be 2.0 $\mu$m. Other condition of this read wiring 200 are commonly used to the write wiring 201, a thickness of polyimide resin 7-1 is selected to be approximately 20 $\mu$m and a thickness of a protection layer 7-2 is selected to be approximately 10 $\mu$m. Also, a film structure of the electric wiring is Au/Ni/Cu/Cr, and is commonly used to the write wiring (film thicknesses are different from each other).

The purpose of this structure is to make the impedance of the read wiring equal to the impedance of the electric wiring (otherwise, read circuit is approached to electric wiring). As a consequence, in order that the characteristic impedance of the electric wiring is set to be capacitive, which is connected to the read wiring corresponding to the capacitive element, the width of the electric wiring is widened. Also, since the current supplied to the read wiring is smaller than that of the write electric wiring, the film thickness thereof is made thinner. In addition to the method for setting the impedance to be capacitive, the film thickness of the insulating layers interposed among the suspension 3, the wiring path 4-3, and the wiring path 4—4 may be made thin.

Similarly, a difference between the characteristic impedance of the write wiring and the characteristic impedance of the read wiring may be realized by varying any one of the following constants, or by varying these constants in a composite manner. These constants are the width of the electric wiring, the thickness of the electric wiring, a specific electric resistance value of the electric wiring, the dielectric constant and the film thickness of the insulating film made in contact with this electric wiring, the distance between the electric wirings, and the stacked layer structure of the electric conductive material for constituting the electric wiring. As a consequence, any of such embodiments in which these constants are varied may be involved in the technical scope of the present invention, while these constant variations are carried out so as to optimize the characteristic impedance of the read wiring and also the characteristic impedance of the write wiring.

Figure 9A:
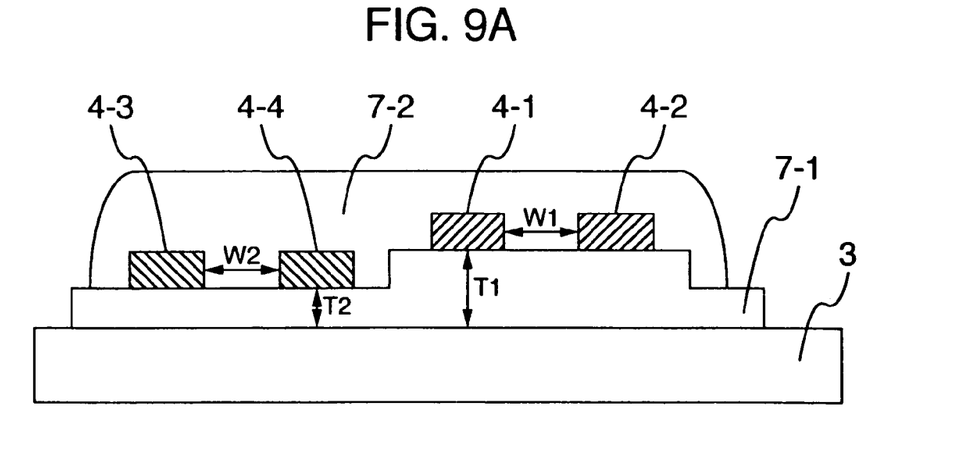
FIGS. 9A, 9B, 9C are conceptional drawings for illustratively indicating arrangements of write wiring pair and read wiring pair, capable of realizing the present invention.
Figure 9B:
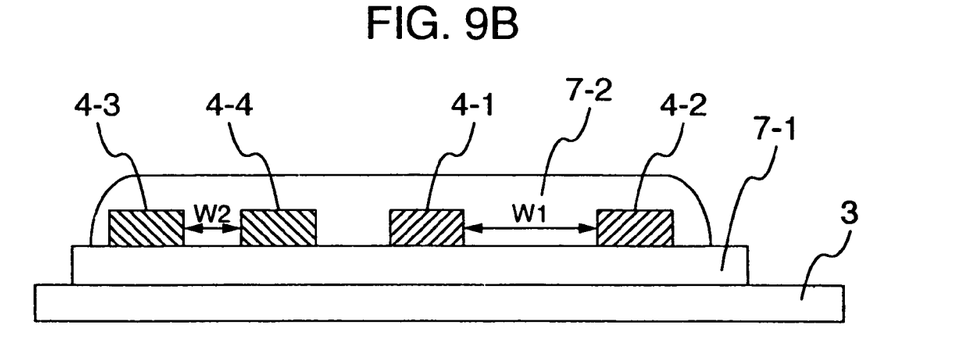
Figure 9C:
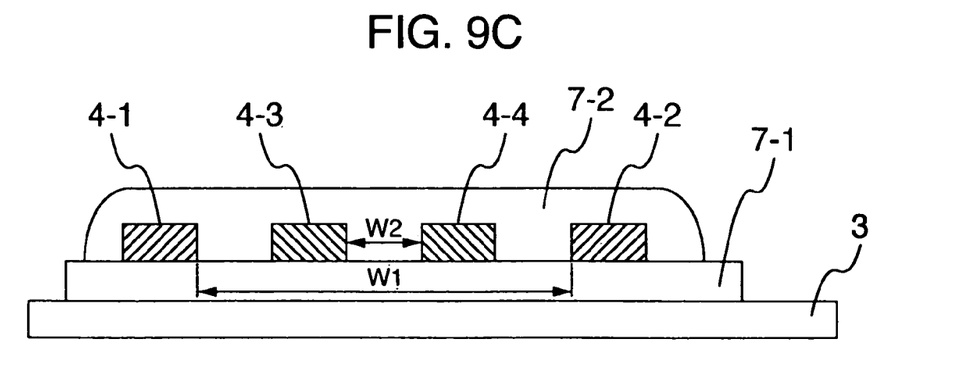

Several concrete examples among these embodiments are indicated in FIG. 9A, FIG. 9B, and FIG. 9C. FIG. 9A represents such a concrete example that film thicknesses of insulating layers are made thin, and are interposed among the suspension 3, a read wiring 4-3, and a read wiring 4—4. In FIG. 9A, reference numerals 4-1 and 4-2 show write wirings; reference numerals 7-1 and 7-2 indicate polyimide resin layers functioning as insulating layers; and symbols W1 and W2 represent an interval between a pair of these write wiring paths and a interval between a pair of these read wiring paths. Also, symbols T1 and T2 show a film thickness of polyimide resin functioning as an insulating layer positioned under the write wiring path, and a film thickness of polyimide resin functioning as an insulating layer positioned under the read wiring path. A relationship between these film thicknesses is given as T1>T2. Since such a thickness relationship is employed, the packaging density of the electric wirings can be improved. FIG. 9B indicates such a concrete example that an interval between a pair of read wiring paths is made smaller than an interval between a pair of write wiring paths. A relationship between these intervals is given as W1>W2. In this concrete example, the insulating layer 7-1 can be made with the same thickness, so that the manufacturing process can be made simple. FIG. 9C represents such a concrete example that a pair of read wiring paths are formed between a pair of write wiring paths, and an interval between the pair of these read wiring paths is made narrower than an interval between the pair of these write wiring paths. As apparent from the foregoing description, a relationship between these intervals is given as W1>W2. With employment of such a structure, the manufacturing process operation can be simplified, and furthermore, the package density of these electric wirings can be improved.

In accordance with the respective embodiment modes, the respective recording system (writing system) and reproducing system (reading system) can be realized under optimum matching conditions. As a result of the effects achieved by this optimum matching condition, the electric signals can be transferred in the high efficiency as well as the high precision under high frequency condition. As a consequence, the present invention may be applied to high frequency recording operation exceeding the frequency of 500 MHz in near future.

In the respective embodiments, the electric wiring is constituted by a single component. As a result, this single component structure is suitable for realizing such that the characteristic impedance of the electric wiring path is uniformly made. However, the present invention is not limited to such restrictions, both the electric wiring may be constituted by employing an electric cable made by connecting a plurality of signal paths. In this alternative case, it is obvious that each of these plural wiring paths must satisfy any one of these conditions described in the above-explained embodiments. Furthermore, as a result of our investigation, the difference between the characteristics of these wiring paths should be suppressed smaller than 10%. If this difference between these characteristic impedances is large, then reflections newly occur at coupling portions, and thus desirable rise time "τ" cannot be obtained due to these reflections. It should be noted that the restriction of 10% could be established based upon our experiment results, depending upon condition related to the rise time "τ", a difference of approximately 20% between characteristic impedances may be expected so as to achieve the effect according to the present invention. Therefore, this difference of 20% may be involved in the technical scope of the present invention.

While the present invention has been described in detail, it is possible to realize such a magnetic disk apparatus capable of performing the high frequency recording operation by employing the low-cost structural components. Also, the high frequency recording operation of the magnetic disk apparatus can be realized without no limitation in the lengths of the electric wirings, while the present invention is applied.

What is claimed is:

1. A magnetic disk apparatus comprising:
   a magnetic recording medium;
   a magnetic recording head suspended by a suspension member and provided opposite to a surface of said magnetic recording medium;
   a reproducing head suspended by the suspension member and provided opposite to the surface of said magnetic recording medium;
   a recording/reproducing circuit;
   a first electric wiring pair formed above said suspension member, connecting said recording/reproducing circuit and said magnetic recording head;
   a second electric wiring pair formed above said suspension member, connecting said recording/reproducing circuit and said reproducing head;
   an arm supporting said suspension member;
   a carriage holding said arm;
   a rotary actuator driving said carriage; and
   a spindle motor rotating said magnetic recording medium;
   wherein:
   an interval between the electric wirings which constitute said first electric wiring pair is made wider than an interval between the electric wirings which constitute said second electric wiring pair.

2. A magnetic disk apparatus as claimed in claim 1, wherein:
   the characteristic impedance of the electric wiring pair for said magnetic recording element is higher than impedance of said magnetic recording element.

* * * * *

UNITED STATES PATENT AND TRADEMARK OFFICE
CERTIFICATE OF CORRECTION

PATENT NO. : 7,016,156 B2 Page 1 of 1
APPLICATION NO. : 10/961035
DATED : March 21, 2006
INVENTOR(S) : Y. Maruyama et al.

It is certified that error appears in the above-identified patent and that said Letters Patent is hereby corrected as shown below:

ON THE TITLE PAGE

Please correct (63) Related U.S. Application Data to read as follows:

(63) Continuation of application No. ~~10/624,939~~ 10/624,839, filed Jul. ~~22~~23, 2003, now Pat. No. 6,894,87, which is a continuation of application No. 10/318,114, filed Dec. 13, 2002, now Pat. No. 6,661,613, which is a continuation of application No. 10/126,576, filed April 22, 2002, now Pat. No. 6,529,348, which is a continuation of application No. 09/523,383, filed Mar. 10, 2000, now Pat. No. 6,404,594.

Signed and Sealed this

Twenty-fifth Day of July, 2006

JON W. DUDAS
*Director of the United States Patent and Trademark Office*